No. 880,773. PATENTED MAR. 3, 1908.
R. BANNISTER.
MILLING CUTTER.
APPLICATION FILED DEC. 29, 1906.

WITNESSES
W. P. Burke
Alvin T. White

INVENTOR
Robert Bannister
BY Richardson
ATT'YS

UNITED STATES PATENT OFFICE.

ROBERT BANNISTER, OF BIRMINGHAM, ENGLAND.

MILLING-CUTTER.

No. 880,773.

Specification of Letters Patent.

Patented March 3, 1908.

Application filed December 29, 1906. Serial No. 349,993.

*To all whom it may concern:*

Be it known that I, ROBERT BANNISTER, subject of Great Britain, residing at 5 Latimer street, Bath Row, in the city of Birmingham, England, have invented new and useful Improvements Relating to Milling-Cutters, of which the following is a specification.

This invention relates to milling cutters as employed for the cutting or shaping of metals and other materials and of the type in which a number of separate tools are secured around the periphery of a body part or holder.

The invention has for its object the economical construction of milling cutters as aforesaid with simple and effective means whereby the separate tools can be readily attached and detached as required.

The invention comprises a number of independent cutting tools of cylindrical form inserted within correspondingly shaped apertures disposed in any suitable arrangement around the periphery of a body part or holder, and a cylindrical cotter pin for each tool fitting within an aperture in the holder formed parallel with the cutting tool aperture, the adjacent portions of the tools and cotter pins being formed with oppositely inclined flat faces whereby a wedging action can be set up between them; and also the provision of means as hereinafter described whereby the aforesaid cotters can be individually withdrawn for the removal of the cutting tools as required.

Figure 1:
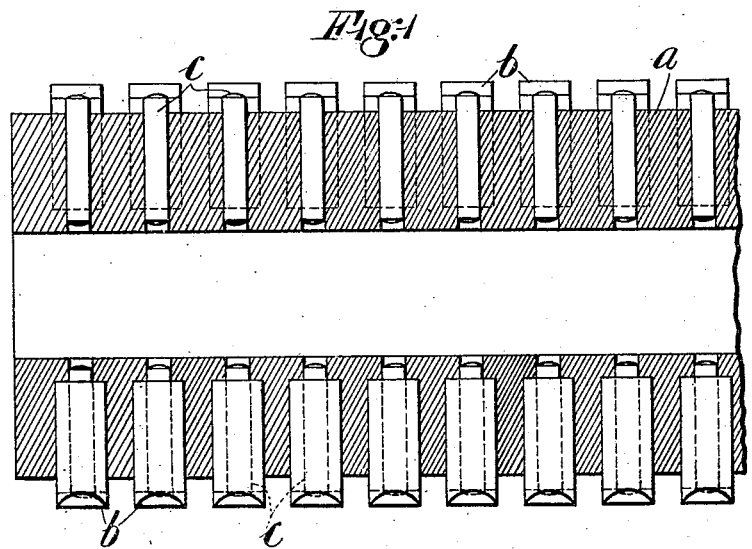
Figure 2:
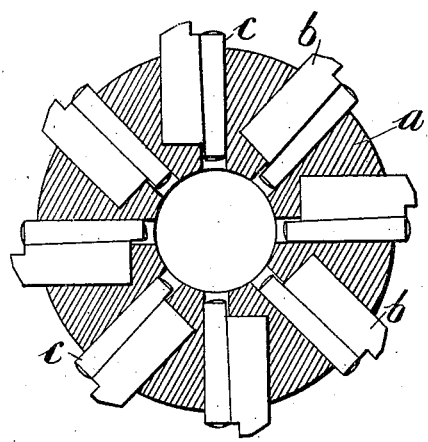
Figure 3:
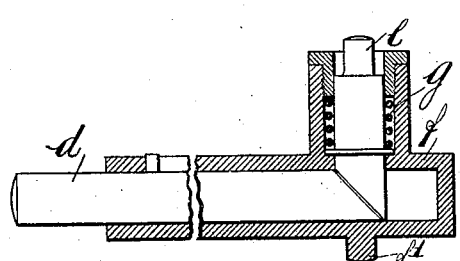
Figure 4:
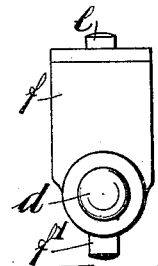

Referring to the accompanying sheet of explanatory drawings:—Figure 1 is a longitudinal section and Fig. 2 a transverse section of a milling cutter constructed in accordance with this invention. Figs. 3 and 4 are respectively longitudinal and transverse sections, to a larger scale than Figs. 1 and 2, of the cotter ejecting device.

The same reference letters in the different views indicate the same parts.

In the construction of a milling cutter as illustrated, the body part or holder $a$, which is provided with a central bore for the reception of a mandrel in the ordinary manner, is drilled around its periphery with a number of radial cylindrical apertures, and into the said apertures cutting tools $b$ made from steel of corresponding cross section are inserted. The holder is preferably made, as is customary, from cast iron, mild steel, or other suitable metal that is less costly than that from which the tools are made. The tool apertures in the holder are sufficiently deep to provide an adequate support for the inserted cutting tools, but complete penetration to the bore of the holder is avoided whenever practicable in order that by the material at the base of such apertures an abutment may be provided for the inner ends of the tools.

Adjacent to each of the tool apertures a cylindrical cotter aperture is formed parallel therewith for the reception of a correspondingly shaped steel cotter $c$. The cotter apertures extend from the periphery to the bore of the holder $a$ and are drilled sufficiently close to the tool apertures as to intersect the latter and thus enable the cotters $c$ to abut laterally against the tools $b$. Along adjacent portions both the tools and the cotters are formed (by grinding, filing or other ordinary operations) with flat longitudinal surfaces which are oppositely inclined in the direction of their length so that a wedging action can be set up between them. After the tools have been inserted in their apertures the cotters are placed in position and driven sufficiently to provide for the required security of the tools.

Usually it is advisable to have as little as possible of the tools $b$ projecting beyond the holder $a$ in order to obtain sufficient rigidity of the tools; the cotters must therefore necessarily be driven so far into the block $a$ as to render it inconvenient to withdraw the same by an appliance acting on their outer ends.

For the withdrawal of the cotters, an ejecting tool is consequently inserted within the bore of the body part or holder and arranged to operate individually on the inner ends of each of the cotters to be withdrawn. The said tool comprises essentially a punch $e$ adapted to be placed in line with the cotters and a plunger $d$ arranged coaxially with the milling cutter for operating the punch. The adjacent extremities of the punch and plunger are inclined at about forty-five degrees or are otherwise so adapted that when a blow is given to the plunger $d$, such as by means of a hand hammer, a movement at right angles is given to the punch. Both the punch and plunger are carried in a suitable holder $f$ which can be inserted bodily in the bore of the milling cutter. A spring $g$ is arranged in conjunction with either the punch or plunger to restore both to their initial position after each blow. In the drawings the spring $g$ is shown in conjunction with the punch $e$. A nipple $f'$ on the body $f$ serves for positioning the ejector, the said nipple being inserted in a cotter aperture opposite to that of the cotter to be ejected.

Milling cutters constructed as hereinbefore described can be readily produced at small cost, and the cutters very conveniently renewed when required. In the event of breakage of one of the tools this can be replaced without interfering with the others, as the cotters, while providing ample security when in use, can be easily withdrawn. By suitably arranging the tool apertures any required disposition of the tools can be obtained, and by varying the relation of the tool and cotter apertures the cotters can be situated either at the front or rear of the tools. In the application of the invention to a face cutter the tools are also secured as aforesaid, the cotter apertures being then made to pass from one side or face to the other so that the cotters can be conveniently withdrawn.

Having thus described my invention what I claim and desire to secure by Letters Patent is:—

In milling cutters, the combination consisting of a holder, cylindrical tool apertures around the said holder, cylindrical cotter apertures formed exactly parallel with and intersecting the said tool apertures, cylindrical tools fitted within the tool apertures and each provided with a flat surface inclined to the axis of the tool, and cylindrical cotters fitted into the cotter apertures and each formed with a flat surface oppositely inclined to those on the tools, substantially as set forth.

In testimony whereof I have signed my name to this specification in the presence of two subscribing witnesses.

ROBERT BANNISTER.

Witnesses:
   JOHN MORGAN,
   HARRY DAVIS.